(12) United States Patent
Chinnapalli et al.

(10) Patent No.: US 11,451,897 B1
(45) Date of Patent: Sep. 20, 2022

(54) DYNAMIC SELECTION OF PRIMARY WIRELESS EARBUD DEVICE

(71) Applicant: Amazon Technologies, Inc., Seattle, WA (US)

(72) Inventors: Sai Prashanth Chinnapalli, Dublin, CA (US); Muhaiyadeen Ansarullah Habibullah, Santa Clara, CA (US); Ganesha Batta, Pleasanton, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 367 days.

(21) Appl. No.: 16/707,366

(22) Filed: Dec. 9, 2019

(51) Int. Cl.
| | |
|---|---|
| *H04R 1/10* | (2006.01) |
| *H04W 4/80* | (2018.01) |
| *H04B 17/318* | (2015.01) |
| *H04W 24/08* | (2009.01) |
| *H04W 76/10* | (2018.01) |

(52) U.S. Cl.
CPC ......... *H04R 1/1041* (2013.01); *H04B 17/318* (2015.01); *H04R 1/1016* (2013.01); *H04W 4/80* (2018.02); *H04W 24/08* (2013.01); *H04W 76/10* (2018.02); *H04R 2420/07* (2013.01)

(58) Field of Classification Search
CPC .... H04R 1/1041; H04R 1/1016; H04B 17/38; H04W 4/80; H04W 76/10; H04W 24/08
See application file for complete search history.

(56) References Cited

U.S. PATENT DOCUMENTS

| | | | |
|---|---|---|---|
| 2010/0054512 A1* | 3/2010 | Solum ................... | H04B 17/309 381/315 |
| 2019/0082371 A1* | 3/2019 | Burt ....................... | H04W 36/30 |
| 2020/0221359 A1* | 7/2020 | Srivastava .............. | H04W 4/80 |

\* cited by examiner

*Primary Examiner* — Rasha S Al Aubaidi
(74) *Attorney, Agent, or Firm* — Eversheds Sutherland (US) LLP

(57) ABSTRACT

Systems, methods, and computer-readable media are disclosed for dynamic selection of a primary wireless earbud device. In one embodiment, an example system may include a first wireless earbud device having first memory and at least one first processor configured to access the first memory. The at least one first processor may execute computer-executable instructions to determine a first RSSI value for a first connection to a device, determine a first packet error rate value for the first connection, and determine a first link quality score using the first RSSI value and the first packet error rate value. The at least one first processor may execute computer-executable instructions to determine that the first link quality score is less than or equal to a handover threshold, disconnect from the device, and cause a second wireless earbud device to establish a second connection to the device.

19 Claims, 6 Drawing Sheets

DYNAMIC SELECTION OF PRIMARY WIRELESS EARBUD DEVICE

BACKGROUND

Wireless earbuds may be used by users to listen to music and other audio streamed from a connected device, such as a smartphone. In some instances, wireless earbuds may include integrated microphones that allow users to wirelessly talk to other users via a phone call. Wireless earbuds may have certain ranges within which connectivity to a device is maintained. Ranges may depend on a type of connection, such as Bluetooth, as well as hardware specifications and other factors. Users may therefore transport a device to which wireless earbuds is connected with the user, such as in a pocket. However, radio interference may be caused by objects between the device and the wireless earbuds, such as the human body. Accordingly, dynamic selection of primary wireless earbud devices may be desired.

Figure 1:
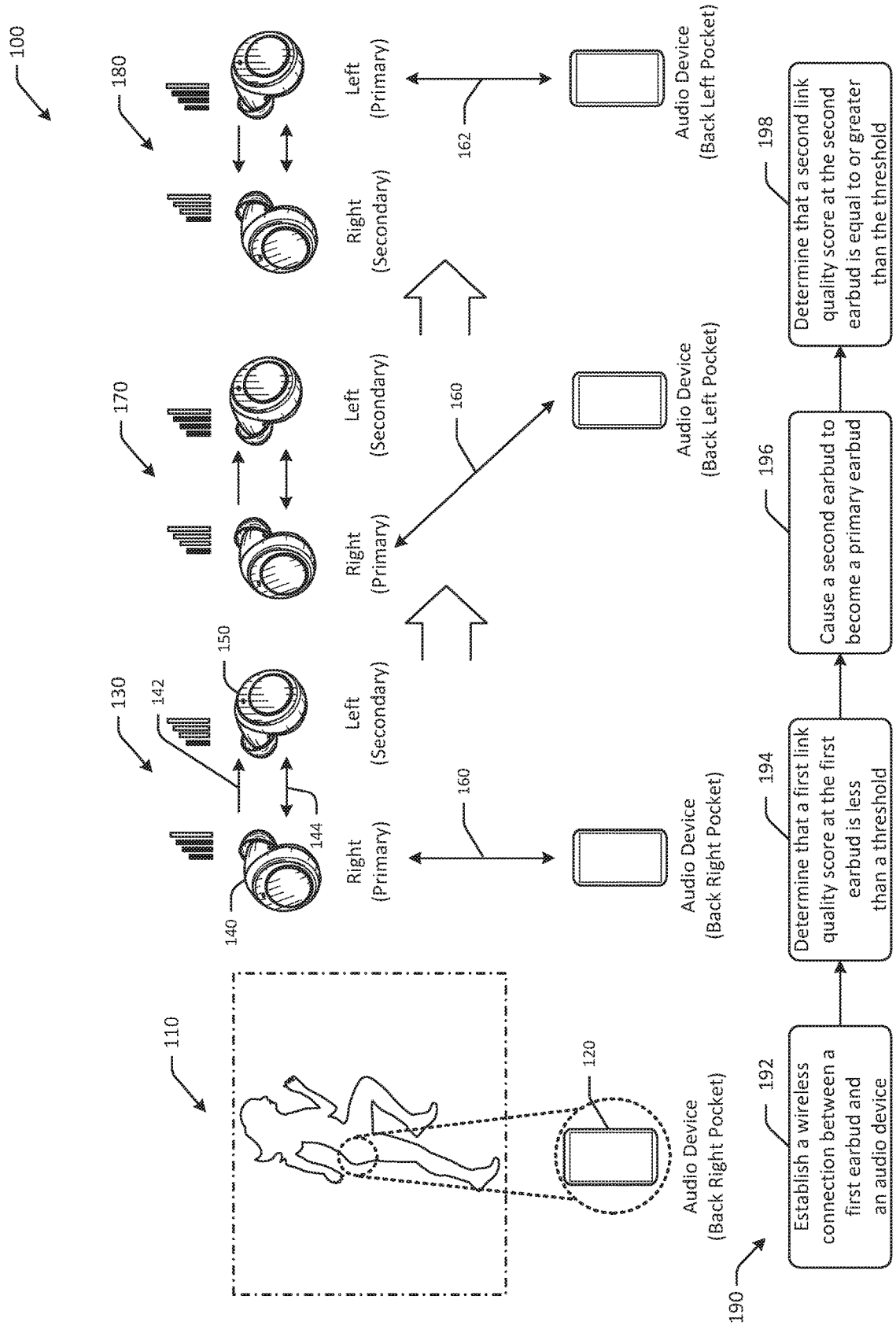
FIG. 1 is an example use case and schematic drawing of dynamic selection of primary wireless earbud device in accordance with one or more embodiments of the disclosure.

The drawings are provided for purposes of illustration only and merely depict example embodiments of the disclosure, and the detailed description in the following section is set forth with reference to the accompanying drawings. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Wireless earbud devices, such as wireless earphones (e.g., earphones inserted into the ear, etc.), and the like may be used to consume audio content, talk to other users (in instances where such devices include microphones), interact with voice assistants, and so forth. In an example, wireless earbud devices may be connected to a streaming device, such as a phone, wearable, tablet, or other device, that provides audio content for consumption by a user. Some streaming devices may be portable, such as phones. Accordingly, users may place a phone in their pocket while using wireless earbud devices.

The distance between wireless earbud devices and a streaming device may impact a connection quality between the devices. In addition, other factors, such as radio frequency absorption and other interference may be caused by the human body between the streaming device and the wireless earbud devices. Minor changes in distance, or an amount of interference, may negatively impact the connection quality, and may result in the loss of audio data. Such loss of audio data may be perceivable by a user in the form of sound stutter, and may negatively impact a user experience. Minor changes in distance may occur, for example, when a user places a streaming device in a back pocket instead of a front pocket, or when a user places a streaming device in a left side or right side pocket. This is because wireless earbud devices may operate with a first wireless earbud devices being wirelessly connected to the streaming device, and the second wireless earbud device being connected to the first wireless earbud device. Depending on which wireless earbud device is connected to the streaming device (e.g., which wireless earbud device is the primary device, etc.), placement of a streaming device in an opposite pocket may create connection quality issues. In particular, connection quality issues may appear in cross-body situations, where, for example, a right side wireless earbud device is connected to a streaming device that is placed in a left side rear pocket, or in some instances, a left side front pocket. Factors such as ambient environment (e.g., wind, etc.), body mass, and other factors may also impact the level of connection quality issue that may be experienced, in addition to the distance between the primary wireless earbud device and the streaming device. Users may be unaware of which wireless earbud device is the primary device, and may therefore not be aware that placement of a streaming device in a certain location (e.g., front right pocket, etc.) may result in a reduced likelihood of connection quality issues.

This disclosure relates to, among other things, systems, methods, computer-readable media, techniques, and methodologies for dynamic selection of primary wireless earbud device. Embodiments of the disclosure include methods and systems that dynamically handover a connection to a streaming device between wireless earbud devices, such that the best wireless connection to the streaming device is obtained. Embodiments may therefore improve performance of wireless earbud devices by reducing audio data loss and improving connection quality, as well as result in an improved user experience with wireless earbud devices.

Referring to FIG. 1, an example use case 100 for dynamic selection of primary wireless earbud device over time is illustrated in accordance with one or more embodiments of the disclosure. A user 110 may be exercising outdoors while wearing wireless earbuds that are connected to an audio device 120, such as a phone or other streaming device, in the back right pocket of the user. Because the user 110 is outdoors, reflection of a signal from the audio device 120 to the wireless earbuds may be limited, and the connection may be susceptible to issues. In addition, wind and other environmental factors may impact the connection. The wireless earbuds may be connected to the audio device 120 over a Bluetooth connection. More specifically, one of the wireless earbuds may be connected to the audio device 120 over a Bluetooth connection, and the other wireless earbud may be connected to the first wireless earbud.

At a first instance 130, the audio device 120 may be in the back right pocket of the user. The user 110 may be wearing a first wireless earbud device, or a first earbud 140, and a second wireless earbud device, or a second earbud 150. The first earbud 140 may be a right side earbud and the second earbud 150 may be a left side earbud. The first earbud 140 may be a default primary earbud, and may therefore establish a first Bluetooth connection 160 to the audio device 120 when the user 110 initiates a listening session. The first earbud 140 may be wirelessly coupled to the second earbud 150 over an audio-only connection 142 (e.g., Near Field Magnetic Induction (NFMI), etc.), over which audio data may be sent to the second earbud 150. NFMI is a short range wireless physical layer that communicates by coupling a tight, low-power, non-propagating magnetic field between devices. The first earbud 140 may also be wirelessly coupled to the second earbud 150 over a control data connection 144 (e.g., Bluetooth Low Energy (BLE), etc.), over which instructions, link scores, and/or other data may be shared between the first earbud 140 and the second earbud 150.

At the first instance 130, the audio device 120 may be in the back right pocket of the user 110. As a result, although the audio device 120 is in the back pocket of the user 110, instead of a front pocket, the connection quality between the audio device 120 and the first earbud 140 may be acceptable. Accordingly, audio data from the audio device 120 may be sent to the first earbud 140 over the first Bluetooth connection 160, and may be sent from the first earbud 140 to the second earbud 150 over the NFMI connection 142. The second earbud 150 may therefore be the secondary earbud.

In some embodiments, when a Bluetooth connection is initially established between wireless earbuds and an audio device, a 3 Mbps link selection for Bluetooth connection may be automatically disabled, and a 2 Mbps link may be activated. The 2 Mbps link may provide a margin of approximately 6 db, where margin is a difference between a transmission power, such as 10 db, and a receive sensitivity at the wireless earbud (e.g., the minimum power at which the wireless earbud can detect a signal using its chipset, etc.). The margin may be greater at 2 Mbps than at a 3 Mbps link, and the 3 Mbps may therefore be disabled automatically in some embodiments.

At a second instance 170, the user 110 may move the audio device 120 from the back right pocket to a back left pocket, creating a cross-body situation. The audio device 120 may still be connected to the first earbud 140 over the first Bluetooth connection 160. As a result, the connection quality may be negatively impacted, due to the distance between the devices, the increased body mass between the devices, and/or any environmental factors. The connection quality may therefore be negatively impacted (as represented by the reduced number of antenna bars at the second instance 170). The first earbud 140 may determine, using process flow 190 as described below, that a link quality score for the connection has dropped below a handover threshold, and may initiate a handover to the second earbud 150. The first earbud 140 may disconnect from the audio device 120, and may send instructions to the second earbud 150 to establish a connection to the audio device 120. The first earbud 140 may also send its most recent link quality score to the second earbud 150.

At a third instance 180, the second earbud 150 may become the primary earbud, and may establish a second Bluetooth connection 162 to the audio device 120. The second earbud 150 may therefore receive audio data from the audio device 120, and may share audio data with the first earbud 140 over the NFMI connection. As a result, performance of the wireless earbuds may be improved due to increased connection quality to the audio device 120.

An example process flow 190 is illustrated in FIG. 1. At a first operation 192, a wireless connection may be established between a first earbud and an audio device. The first earbud may be part of a system with a second earbud, where both earbuds may be configured for wireless communication with each other and an audio device. The first earbud may be a default primary earbud (e.g., a right side earbud may be determined to be a default primary earbud, etc.). Accordingly, during use, the first earbud may establish a first connection, such as a Bluetooth connection, to an audio device, such as a phone or other streaming device.

At a second operation 194, the first earbud may determine that a first link quality score at the first earbud is less than a handover threshold. The link quality score may be a score generated by the first earbud representative of the quality of the connection between the first earbud and the audio device. The link quality score may be determined using one or more connection parameters, such as received signal strength (RSSI) measurements (or RSSI values determined using one or more mapping tables, as discussed with respect to FIG. 3), packet error rate measurements (or packet error rate values determined using one or more mapping tables, as discussed with respect to FIG. 3), and/or other factors. RSSI measurements may be a measurement representing how well the first earbud is receiving a signal from the audio device. RSSI may be affected by a transmit power of the audio device. RSSI may be measured in decibels (db). Packet error rate measurements may be used to test the performance of a receiver of the first earbud. Packet error rate may be represented as the ratio, in percent, of the number of packets (which may be test packets) not successfully received by the first earbud to the number of packets (which may be test packets) sent to the first earbud. The handover threshold may be a minimum link quality score value below which handover should be executed. The handover threshold may be the minimum link quality score needed to have a satisfactory user experience in consuming audio content at the first earbud.

At a third operation 196, the first earbud may cause the second earbud to become a primary earbud. As a result, the first earbud may disconnect from the audio device, and the second earbud may establish a connection to the audio device. In some embodiments, the second earbud may assume the MAC address, or other device identifier, of the first earbud to establish the connection. The connection may be a Bluetooth connection to the audio device. The second earbud may therefore become the primary device (e.g., the earbud connected to the audio device, etc.), and may provide audio to the first earbud via the NFMI connection.

At a fourth operation 198, the second earbud may determine that a second link quality score at the second earbud is equal to or greater than the handover threshold. For example, the second link quality score may represent the connection between the second earbud and the audio device, and may be greater than the handover threshold. This may therefore indicate that the audio connection is acceptable and that the user experience with the audio is acceptable. The second earbud may continue monitoring one or more link quality score parameters and generating link quality scores to ensure the link quality score stays at or above the handover threshold, and if not, that handover back to the first earbud is executed. Accordingly, embodiments of the disclosure may improve performance of audio streaming to wireless earbud devices.

Example embodiments of the disclosure provide a number of technical features or technical effects. For example, in accordance with example embodiments of the disclosure, certain embodiments of the disclosure may dynamically select a primary wireless earbud device, and may handover wireless connection to an audio device based at least in part on one or more metrics determined by earbud devices or streaming devices. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
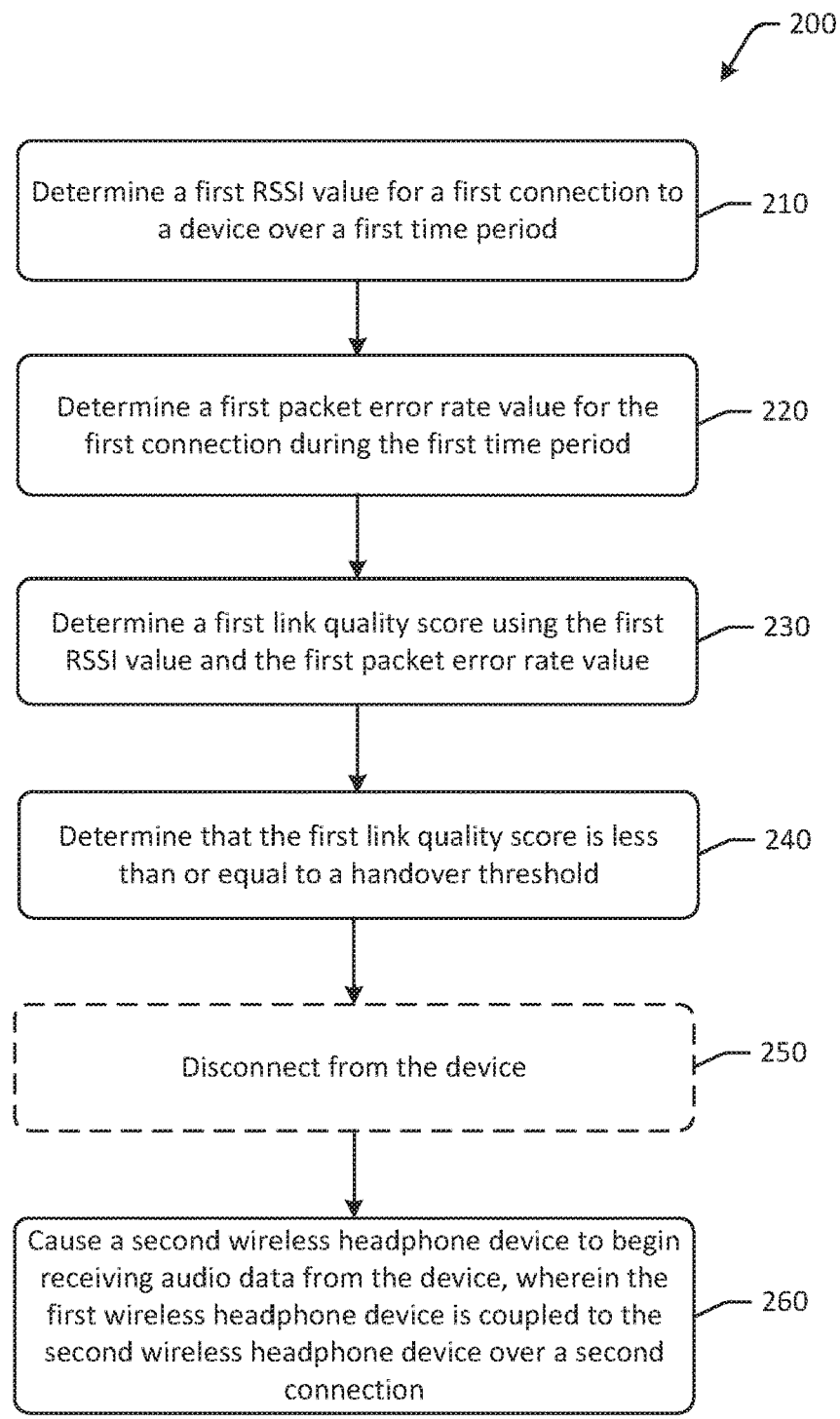
FIG. 2 is an example process flow for dynamic selection of primary wireless earbud device in accordance with one or more embodiments of the disclosure.

FIG. 2 is an example process flow 200 for dynamic selection of primary wireless earbud device in accordance with one or more embodiments of the disclosure. One or more of the operations of FIG. 2 may be performed at a wireless earbud device in some embodiments. One or more of the operations of the process flow 200 may be optional and may be performed in any order or at least partially concurrently in some embodiments.

At block 210 of the process flow 200, a first RSSI value for a first connection to a device over a first time period may be determined. For example, one or more computer processors at a first wireless earbud device may execute one or more modules having computer-executable instructions to determine a first RSSI value for a first connection to a device. The first wireless earbud device may be part of a system that may include a second wireless earbud device. The first wireless earbud device may determine a first RSSI value for a first connection to a streaming device. The first RSSI value may be a measured RSSI value during a certain instance in time, an average measured RSSI value during a certain time interval, or may be a value determined using a mapping table, where the value is associated with one or more measured RSSI values. For example, as discussed with respect to FIG. 3, a mapping table that associates various RSSI measurements with RSSI values may be used to determine the first RSSI value. The first RSSI value may be for a certain time interval. The first RSSI value may be for a first Bluetooth connection to a streaming device that provides audio to the first wireless earbud device. In some embodiments, RSSI may be measured in measurement windows, such as windows having a length of five seconds, and sliding intervals of one second may separate measurement windows (where data collected during sliding intervals may be discarded). Samples or measurements may be collected every 500 milliseconds in an embodiment. In an embodiment, the first wireless earbud device may determine an average RSSI measurement during a first time interval, and may determine the first RSSI value associated with the average RSSI measurement in a first mapping table, the first mapping table including ranges of average RSSI measurements associated with respective average RSSI values.

At block 220 of the process flow 200, a first packet error rate value for the first connection during the first time period may be determined. For example, one or more computer processors at the first wireless earbud device may execute one or more modules having computer-executable instructions to determine a first packet error rate value for the first connection. The first wireless earbud device may determine a first packet error rate value for a first connection to the streaming device. The first packet error rate value may be a measured packet error rate value during a certain instance in time, an average measured packet error rate value during a certain time interval, or may be a value determined using a mapping table, where the value is associated with one or more measured packet error rate values. For example, as discussed with respect to FIG. 3, a mapping table that associates various packet error rate measurements with packet error rate values may be used to determine the first packet error rate value. The first packet error rate value may be for a certain time interval. The first packet error rate value may be for a first Bluetooth connection to a streaming device that provides audio to the first wireless earbud device. In some embodiments, packet error rate may be measured in measurement windows, such as windows having a length of five seconds, and sliding intervals of one second may separate measurement windows (where data collected during sliding intervals may be discarded). Samples or measurements may be collected every 500 milliseconds in an embodiment. The packet error rate may represent a stutter count that is measured by counting underflow flags in a certain moving measurement window. In an embodiment, the first wireless earbud device may determine an average packet error rate measurement during the first time interval, and may determine the first average packet error rate value associated with the average packet error rate measurement in a second mapping table, the second mapping table including ranges of average packet error rate measurements associated with respective average packet error rate values.

At block 230 of the process flow 200, a first link quality score using the first RSSI value and the first packet error rate value may be determined. For example, one or more computer processors at the first wireless earbud device may execute one or more modules having computer-executable instructions to determine a first link quality score using the first RSSI value and the first packet error rate value. The link quality score may represent the quality of a connection to the streaming device for a particular time interval. To determine the first link quality score, the first wireless earbud device may use one or more equations or algorithms. For example, the first wireless earbud device may determine a sum of the first RSSI value and one-fourth of the first packet error rate value. The first wireless earbud device may determine the first link quality score using the sum, where the first link quality score is equal to the sum divided by two and subtracted from 100. Other embodiments may use different equations or algorithms, and may assign different weighting to the RSSI value and/or packet error rate value.

At block 240 of the process flow 200, it may be determined that the first link quality score is less than or equal to a handover threshold. For example, one or more computer processors at the first wireless earbud device may execute one or more modules having computer-executable instructions to determine that the first link quality score is less than or equal to a handover threshold. The handover threshold may represent a minimum link quality score under which handover should occur. If the first link quality score is greater than the handover threshold, the connection between the first wireless earbud device and the streaming device may be maintained. If the first link quality score is less than or equal to the handover threshold, handover may occur and the connection between the first wireless earbud device and the streaming device may be disconnected.

At optional block 250 of the process flow 200, the first wireless earbud device may disconnect from the device. For example, one or more computer processors at the first wireless earbud device may execute one or more modules having computer-executable instructions to disconnect from the streaming device. In some embodiments, the first wireless earbud device may not disconnect from the device, and instead may no longer receive audio data directly from the device, but may receive audio data from a second wireless earbud device (which may receive audio data directly from the device).

At block 260 of the process flow 200, a second wireless earbud device may be caused to begin receiving audio data from the device, wherein the first wireless earbud device is coupled to the second wireless earbud device over a second connection. For example, one or more computer processors at the first wireless earbud device may execute one or more modules having computer-executable instructions to cause a second wireless earbud device to begin receiving audio data directly from the device (which may be via the first connection), wherein the first wireless earbud device is coupled to the second wireless earbud device over a second connection. The first wireless earbud device may send instructions to the second wireless earbud device to begin receiving audio data from the device. The instructions or command may be sent via a third connection, such as a BLE connection, to the second wireless earbud device. The second wireless earbud device may therefore begin receiving audio data from the streaming device, and may provide audio data to the first wireless earbud device over another connection, such as an NFMI connection.

Figure 3:
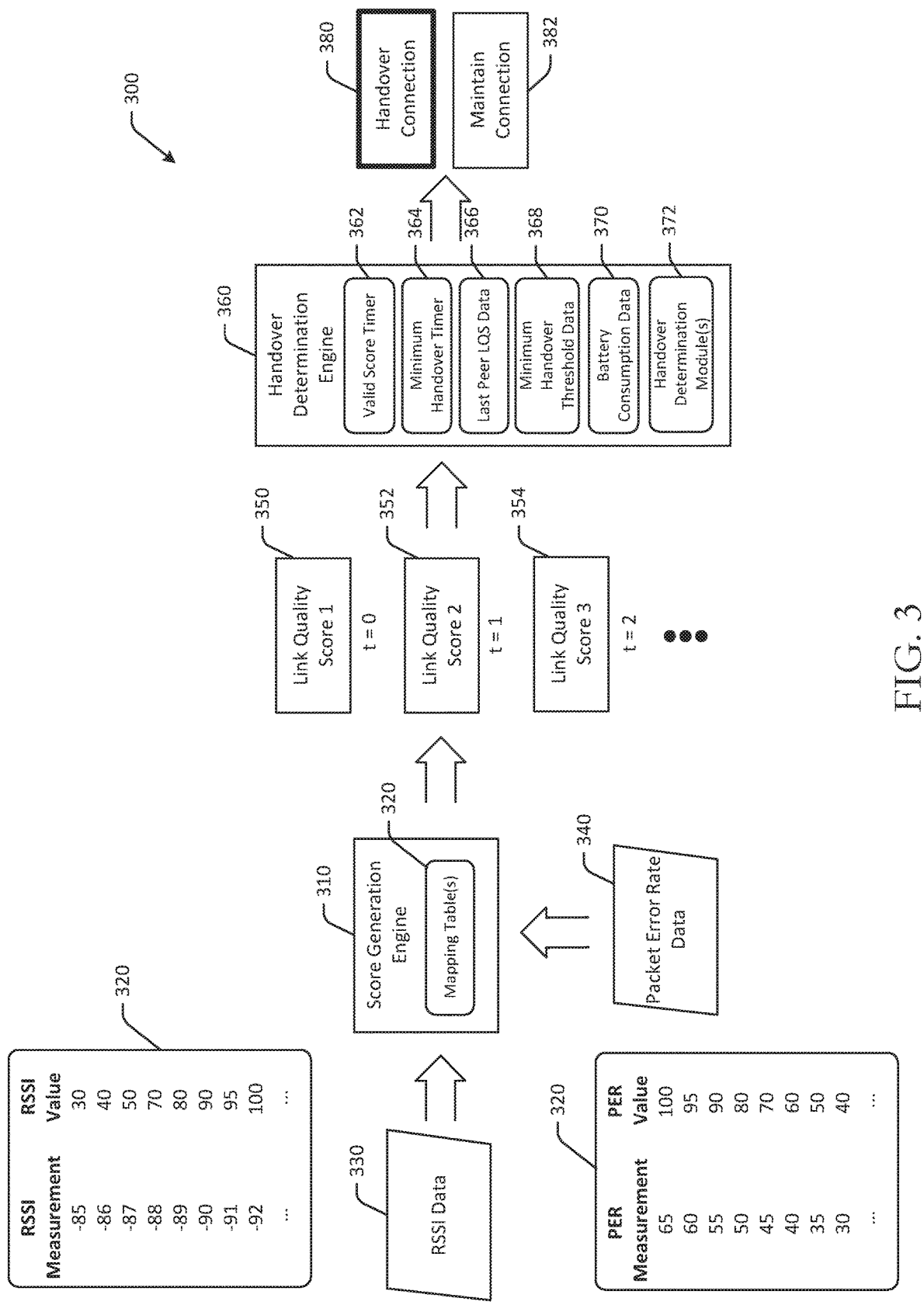
FIG. 3 is a schematic illustration of an example data and process flow for dynamic selection of primary wireless earbud device in accordance with one or more example embodiments of the disclosure.

FIG. 3 is a schematic illustration of an example data and process flow 300 for dynamic selection of primary wireless earbud device in accordance with one or more example embodiments of the disclosure. Different embodiments may include different, additional, or fewer inputs or outputs than those illustrated in the example of FIG. 3.

The data and process flow of FIG. 3 may be executed, for example, by one or more wireless earbud devices to determine whether to handover a connection to a device, such as a smartphone or other streaming device, to another wireless earbud device. To execute a handover, the first wireless earbud device may send a command to a second wireless earbud device to establish a connection to the streaming device, and may disconnect from the streaming device. The second wireless earbud device may, in some instances, assume a device identifier, such as a MAC address, of the first wireless earbud device (or otherwise spoof the first wireless earbud device) and may establish a connection to the streaming device. In some cases, a loss of audio data may occur during handover, but such loss of audio data may not be perceptible to a user listening to the audio.

In FIG. 3, a score generation engine 310 and/or one or more score generation module(s) may be configured to generate one or more link quality scores. The link quality scores may be representative of a quality of a connection to a streaming device during a certain time interval. The score generation engine 310 may be stored at and/or executed by one or more wireless earbud devices. In some embodiments, each wireless earbud device in a system may be configured to execute the data and process flow 300 locally. The score generation engine 310 may include one or more modules or algorithms, and/or databases, and may be configured to generate output link quality scores based at least in part on one or more connection parameters or measurements.

For example, the score generation engine 310 may include, or may otherwise access, one or mapping tables 320. In some embodiments, the mapping tables 320 may be stored in a database in communication with the score generation engine 310. The mapping tables 320 may associate respective RSSI and packet error rate values with respective link quality mappings, where the greater the link quality mapping value, the worse the link quality. The relationship between respective measured RSSI and RSSI values, as well as the relationship between respective measured packet error rate and packet error rate values may be scaled from 0 to 100, in one example. The mapping tables 320 may be data indicative of RSSI values that correspond to a range of one or more RSSI measurements, and/or packet error rate values that correspond to a range of one or more packet error rate measurements. For example, a first mapping table 320 may include various RSSI measurements that are associated with various RSSI values. As depicted in FIG. 3, an RSSI measurement or measured value for a particular time interval of −85 db may be associated with an RSSI value of 30, a measurement of −86 db may be associated with an RSSI value of 40, a measurement of −87 db may be associated with an RSSI value of 50, and so forth, where the greater the RSSI value, the worse the link quality. Similarly, as depicted in FIG. 3, a packet error rate measurement or measured value for a particular time interval of 65 may be associated with a packet error rate value of 100, a measurement of 60 may be associated with a packet error rate value of 95, a measurement of 55 may be associated with a packet error value of 90, and so forth, where the greater the packet error rate value, the worse the link quality. As discussed, the respective RSSI measurement and packet error rate measurement may be average measurement values for a particular time interval, or may be measurements that occur during tests performed during a certain time interval. In some embodiments, measurement values may be used to determine link quality scores without the use of mapping tables.

The score generation engine 310 may determine, for a particular time interval, a link quality score based at least in part on one or more inputs. For example, the score generation engine 310 may receive one or more inputs, such as RSSI data 330 indicative of RSSI measurements that occur during a time interval, and/or packet error rate data 340 indicative of packet error rate measurements that occur during a time interval. The respective RSSI data 330 and/or packet error rate data 340 may be collected or otherwise determined by a wireless earbud device and may be sent or provided to the score generation engine 310.

The score generation engine 310 may use the RSSI data 330 and/or packet error rate data 340, along with the mapping tables 320 to determine a link quality score for a particular time interval. For example, the score generation engine 310 may determine an associated RSSI value and packet error rate value for the respective RSSI data 330 and the packet error rate data 340. In some embodiments, the score generation engine 310 may determine link quality scores using an algorithm, such as:

Link Quality Score=(100−(((RSSI value)+((Packet Error Rate Value)/4))/2))

The score generation engine 310 may process the respective data to generate one or more link quality scores. For example, the score generation engine 310 may output a first link quality score 350 that corresponds to a first time interval (represented by t=0), a second link quality score 352 that corresponds to a second time interval (represented by t=1), a third link quality score 354 that corresponds to a third time interval (represented by t=2), and so forth. The time intervals may be used to determine if a link quality has changed, for example, as a result of a user moving the streaming device to which the wireless earbud device is connected. The score generation engine 310 may continue generation link quality scores while a connection to a streaming device is active.

The link quality scores generated by the score generation engine 310 may be input at a handover determination engine 360. The handover determination engine 360 may be configured to output a determination as to whether a handover should occur, where another wireless earbud device becomes a primary earbud device and/or assumes a connection to the streaming device instead of the current wireless earbud device. To determine whether handover should occur, the handover determination engine 360 may execute one or more modules and/or algorithms. For example, the handover determination engine 360 may include one or more handover determination modules 372. Additional or fewer, or different, modules may be included. The handover determination module(s) 372 may be configured to output a determination as to whether handover should occur based at least in part on the link quality score and one or more other factors.

For example, the handover determination engine 360 may include, or otherwise access, data including a valid score timer 362, a minimum handover time 364, last peer link quality score data 366, minimum handover threshold data 368, and/or battery consumption data 370. The handover determination engine 360 may use one or more of the data in connection with the handover determination.

The valid score timer 362 may be a timer indicative of a length of time that has elapsed since the last peer link quality score data 366 was received from a peer wireless earbud device. The valid score timer 362 may be initiated following receipt of the last peer link quality score data 366, or a link quality score from a peer wireless earbud device. The valid score timer 362 may be used, in one example, by the handover determination module(s) 372 to determine whether the last received, or most recently received, link quality score 366 from a peer wireless earbud device is valid, and if so, whether a current link quality score of the current wireless earbud device is greater than or less than the last peer wireless earbud device (and in some instances, a difference between the respective scores). The valid score timer 362 may be a time value that is compared to a valid score threshold. The valid score threshold may be, in some instances, a static value indicative of a length of time after which the last peer link quality score data 366 is no longer valid. If the last peer link quality score data 366 is not valid (e.g., too long of a length of time has elapsed relative to the valid score threshold, etc.), the last peer link quality score data 366 may be discarded, and the link quality score for the current wireless earbud device may be compared to a minimum link quality score threshold instead. In some embodiments, the valid score threshold may be dynamic and may depend at least in part on how high or low the last peer link quality score is (e.g., a relatively high score may be valid for longer than a relatively low score, etc.). In an example embodiment, the handover determination module(s) 372 may determine that an elapsed time since the last peer link quality score was received is greater than the valid score threshold, and may determine that a link quality score for the current wireless earbud device is to be compared to the handover threshold instead.

The minimum handover timer 364 may be a timer indicative of a length of time that has elapsed since the last handover occurred. For example, the minimum handover timer 364 may be initiated when the current wireless earbud device became the primary device and/or established a Bluetooth connection to the streaming device. The minimum handover timer 364 may be compared to the minimum handover threshold data 368, which may include a minimum handover time value that prevents handover from occurring more than once within a certain period of time. Multiple handovers within a certain length of time may create a "ping pong" effect that is perceptible to a user and results in rapid changing between audio provided between different wireless earbud devices, and may negatively impact a user experience. In some embodiments, the minimum handover time value may increase based at least in part on a number of handovers that have occurred within a certain time interval. For example, the minimum handover time threshold may be 5 seconds if only 1 handover has occurred in the last 3 minutes, and may be 30 seconds if 4 handovers have occurred in the last 3 minutes. Other values may be used. As a result, if poor connection quality is due to a factor other than cross-body positioning of a streaming device, such as the user has walked too far away from a streaming device, the wireless earbud devices may be unable to improve the link quality via handover. The ping pong effect may be less perceptible when no audio playback is active, so in some embodiments, it may be determined that audio playback is active before implementing the minimum handover time threshold. In some embodiments, the minimum handover threshold data 368 may include the handover threshold representing a link quality score value over which handover does not occur. For example, if the link quality score 350 is greater than the minimum link quality score threshold, the handover determination engine 360 may determine that handover is not to occur.

The battery consumption data 370 may be used (e.g., via comparison to a battery consumption threshold, etc.) by the handover determination module(s) 372 to determine an amount of battery that has been consumed at the current wireless earbud device since handover last occurred, or during a current streaming session. The battery consumption data 370 may be used to determine whether a certain amount of battery has been consumed at the current wireless earbud device, and if the amount meets or exceeds a certain value, handover may be initiated. The battery consumption data 370 may be deprioritized relative to other factors used by the handover determination module(s) 372, and in some instances may be used in situations where both the current link quality score and the last peer link quality score are both less than the minimum link quality score threshold, and are within a certain amount of each other (e.g., the difference between the two scores is less than a predetermined threshold, etc.), so as to avoid instances where a significantly worse link is used as a result of battery consumption. In another example, the handover determination module(s) 372 may determine that a difference between a first battery level of the current wireless earbud device and a second battery level of the peer wireless earbud device satisfies a battery consumption threshold (e.g., the difference is greater than or equal to the battery consumption threshold, etc.).

The handover determination engine 360 may therefore output a determination as to whether handover should occur 380, or should not occur and a current connection should be maintained 382. In some embodiments, the handover determination engine 360 may output a decision for each link quality score generated by the score generation engine 310, or may output a decision after each minimum handover time threshold has elapsed. If it is determined that handover is to occur, the current wireless earbud device may send a corresponding command to the peer wireless earbud device, and may disconnect from the streaming device.

Figure 4:
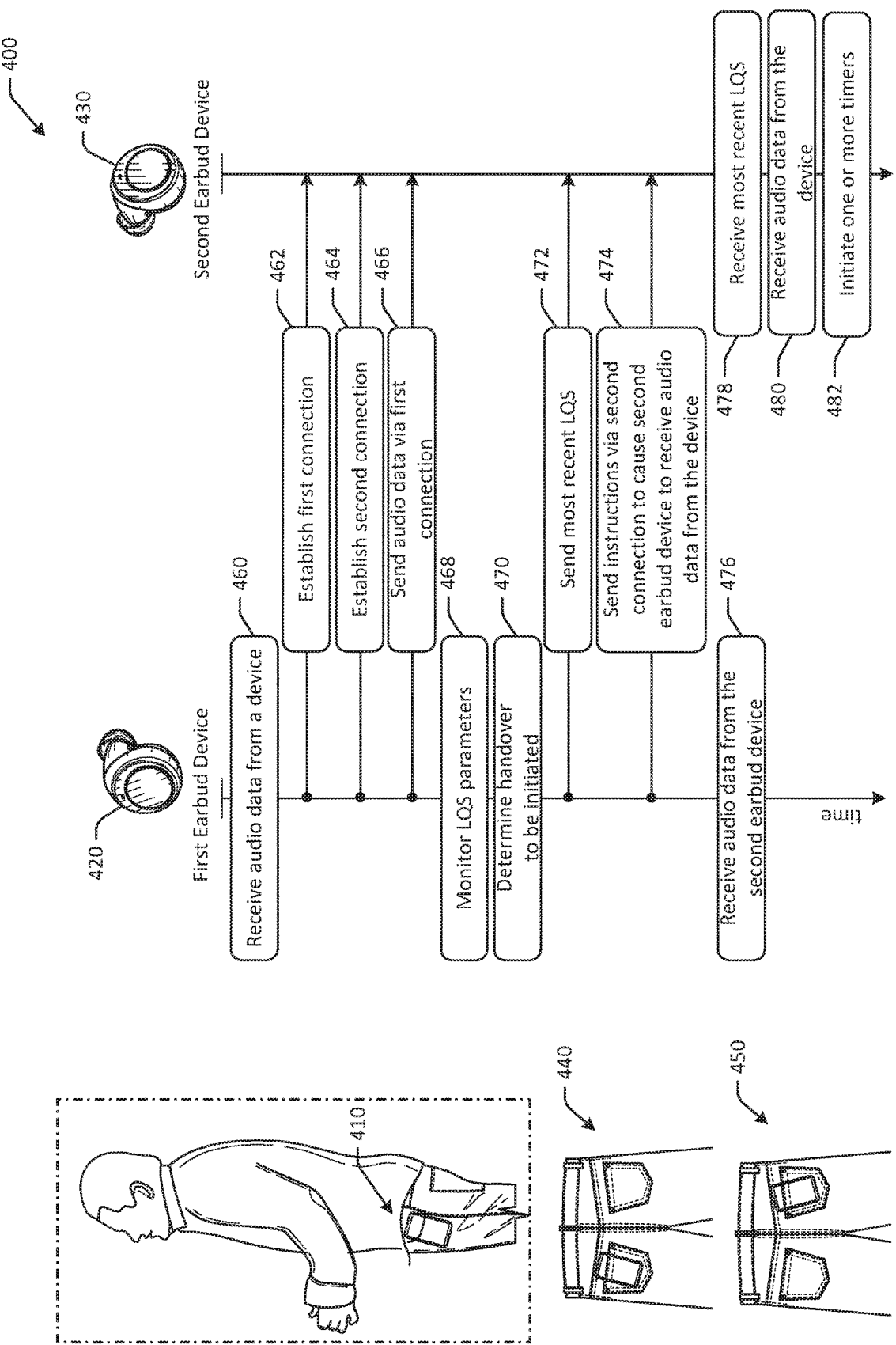
FIG. 4 is a schematic drawing of example earbud-to-earbud device operations and communications over time in accordance with one or more embodiments of the disclosure.

FIG. 4 is a schematic drawing of example earbud-to-earbud device operations and communications over time 400 in accordance with one or more embodiments of the disclosure. The illustrated sequence of operations and/or communications is for illustrative purposes only. Other embodiments may have a different sequence, different operations, and/or different number of operations. Some operations may occur at least partially concurrently, although illustrated as discrete blocks.

In FIG. 4, a user may have a streaming device, such as a phone, in a front left pocket 410. Depending on factors such as soft tissue mass, body envelope, bone density, and so forth, link quality may be impacted as a result of radio frequency interference caused by the human body. As a result, cross-body positioning of streaming devices in front pockets may result in poor connection quality. In addition, users may move a streaming device between pockets, such as into a back left pocket 440 or a back right pocket 450. Depending on the wireless earbud device with the active connection to the streaming device at the time the device is moved into the different positions, link quality may or may not be negatively impacted.

The user may use a set of wireless earbud devices, such as a first wireless earbud device 420 and a second wireless earbud device 430 to stream audio content, such as listen to music, make a telephone call, and the like. The first wireless earbud device 420 and the second wireless earbud device 430 may be coupled via one or more wireless connections, such as an NFMI connection and a BLE connection. The NFMI connection may be used to share audio data, and the BLE connection may be used to communicate instructions and/or other data, such as link quality scores.

As the user uses the first wireless earbud device 420 and the second wireless earbud device 430 to consume audio content, the user may move the streaming device, such as the phone, around, such as into one or more pockets.

The first wireless earbud device 420 and the second wireless earbud device 430 may be configured to determine an initial primary device or default primary device that establishes a Bluetooth connection to the phone. For example, the first wireless earbud device 420 may be a default primary device. The first wireless earbud device 420 may be a right side earbud device in an example. The primary device may periodically or continuously determine whether handover to a peer device should occur. The primary device may make such a determination using one or more computer processors coupled to memory.

For example, referring to the example process flow over time illustrated in FIG. 4, at a first operation 460, the first wireless earbud device 420 may establish a first connection to a streaming device. The first wireless earbud device 420 may be the default primary earbud device. At a second operation 462, the first wireless earbud device 420 may establish a second connection with the second wireless earbud device 430, which may be an audio-only connection such that audio data can be sent from the first wireless earbud device 420 to the second wireless earbud device 430. At a third operation 464, the first wireless earbud device 420 may establish a third connection with the second wireless earbud device 430, which may be a control data connection such that data such as handover instructions can be sent between the earbud devices. At a fourth operation 466, the first wireless earbud device 420 may send audio data to the second wireless earbud device 430 via the first connection for presentation to the user using one or more speakers.

At a fifth operation 468, the first wireless earbud device 420 may monitor one or more link quality score parameters. For example, the first wireless earbud device 420 may monitor RSSI measurements for the Bluetooth connection to the streaming device, packet error rate measurements for the Bluetooth connection to the streaming device, battery consumption data, and/or other parameters. At a sixth operation 470, the first wireless earbud device 420 may determine that handover is to be initiated. For example, the first wireless earbud device 420 may determine that the link quality score is equal to or less than the handover threshold. The first wireless earbud device 420 may therefore determine that a handover is to occur. At a seventh operation 472, the first wireless earbud device 420 may send the most recent link quality score determined by the first wireless earbud device 420 to the second wireless earbud device 430. At an eighth operation 474, the first wireless earbud device 420 may send instructions, via the second connection, to cause the second wireless earbud device 430 to being receiving audio data from the streaming device. At a ninth operation 476, the first wireless earbud device 420 may receive audio data from the second wireless earbud device. The first wireless earbud device 420 may remain connected to the second wireless earbud device 430 via the first connection and the second connection.

At a tenth operation 478, the second wireless earbud device 430 may receive the most recent link quality score from the first wireless earbud device 420, and may store the score as a last peer link quality score. The second wireless earbud device 430 may initiate a timer to determine validity of the last peer link quality score. At an eleventh operation 480, the second wireless earbud device 430 may receive the instructions from the first wireless earbud device 420, and may receive the audio data from the streaming device. At a twelfth operation, the second wireless earbud device 430 may initiate one or more timers, such as a timer reflective of a time since last handoff. The second wireless earbud device 430 may then initiate monitoring of link quality scores for its connection to the streaming device, and may determine whether handover back to the first wireless earbud device 420 or another device is necessary. For example, if the second wireless earbud device 430 determines that a second link quality score for the second connection is greater than the first link quality score received from the first wireless earbud device 420, the second wireless earbud device 430 may maintain the second connection, even if the second link quality score is less than or equal to the handover threshold in some instances.

Figure 5:
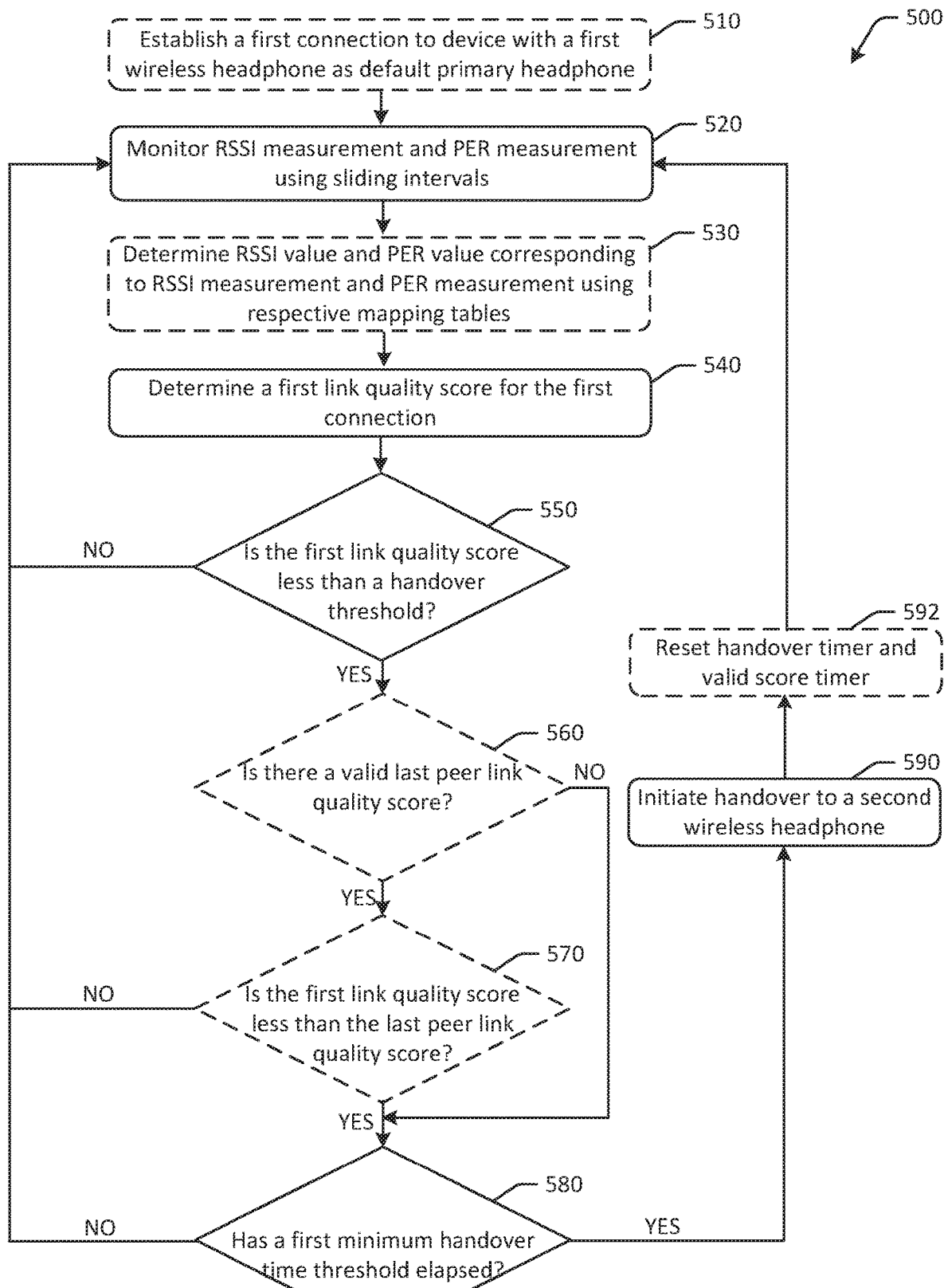
FIG. 5 is a schematic illustration of an example process flow for dynamic selection of primary wireless earbud device in accordance with one or more example embodiments of the disclosure.

FIG. 5 is a schematic illustration of an example process flow 500 for dynamic selection of primary wireless earbud device in accordance with one or more example embodiments of the disclosure. While example embodiments of the disclosure may be described in the context of wireless earbuds and phones, it should be appreciated that the disclosure is more broadly applicable to any type of streaming audio device, including speaker devices, computers, tablets, and so forth. Some or all of the blocks of the process flows in this disclosure may be performed in a distributed manner across any number of devices. Some of the data flow or operations may be optional and may be performed in a different order. The process flow 500 may be executed periodically, continuously, on demand, or at another interval.

At optional block 510 of the process flow 500, computer-executable instructions stored on a memory of a device, such as a first wireless earbud device, may be executed to establish a first connection to a device, such as a phone, where the first wireless earbud device is a default primary earbud. For example, a user may initiate a listening session by placing the first wireless earbud device into an ear, and the first wireless earbud device may establish a first connection to the device.

At block 520 of the process flow 500, computer-executable instructions stored on a memory of a device, such as the first wireless earbud device, may be executed to monitor RSSI measurement and packet error rate measurements using sliding intervals. Measurement windows may represent time intervals during which a certain RSSI measurement and/or packet error rate measurement (or corresponding values) were determined. An example measurement window may be about five seconds. Time between samples or data collection may be about 500 milliseconds. Sliding intervals may be gaps between measurement windows during which any data collected may be discarded. Sliding intervals may have a length of about one second.

At optional block 530 of the process flow 500, computer-executable instructions stored on a memory of a device, such as the first wireless earbud device, may be executed to determine an RSSI value and a PER value corresponding to the RSSI measurement and packet error measurement using the respective mapping tables. For example, some embodiments may use one or mapping tables, such as those discussed with respect to FIG. 3, to correlate measured values to RSSI and/or packet error rate values.

At block 540 of the process flow 500, computer-executable instructions stored on a memory of a device, such as the first wireless earbud device, may be executed to determine a first link quality score for the first connection. The first link quality score may be for a specific time interval and may be determined using one or more of a measured RSSI value, a measured packet error value, an RSSI value, a packet error rate value, and/or other values.

At determination block 550, computer-executable instructions stored on a memory of a device, such as the first wireless earbud device, may be executed to make a determination as to whether the first link quality score is less than or equal to a handover threshold. For example, the first wireless earbud device may compare the first link quality score to the handover threshold to determine whether the first link quality score is less than or equal to the handover threshold.

If it is determined at determination block 550 that the first link quality score is not less than or equal to the handover threshold, this may indicate that audio performance of the first wireless earbud device is acceptable, and the process flow 500 may return to block 520 to continue monitoring link quality score parameters.

If it is determined at determination block 550 that the first link quality score is less than or equal to the handover threshold, the process flow 500 may continue to optional determination block 560.

At determination block 560, computer-executable instructions stored on a memory of a device, such as the first wireless earbud device, may be executed to make a determination as to whether there is a valid last peer link quality score. To determine whether there is a valid last peer link quality score, the first wireless earbud device may determine whether a last peer link quality score was received from a second wireless earbud device, and if so, whether the score is valid. Validity may be determined based at least in part on an elapsed time since the score was received. For example, if the first wireless earbud device determines that an elapsed time since the last peer link quality score was received is greater than a valid score threshold, the last peer link quality score may be determined to be invalid. In another example, validity may be determined based at least in part on whether a wireless earbud device was removed from the ear of a user. For example, if it is determined that a wireless earbud device was removed from an ear, the last score may be invalidated. If the first wireless earbud device determines that an elapsed time since the last peer link quality score was received is less than or equal to a valid score threshold, the last peer link quality score may be determined to be valid. If it is determined at determination block 560 that the last peer link quality score is invalid, the process flow 500 may proceed to determination block 580. If it is determined at determination block 560 that the last peer link quality score is valid, the process flow 500 may proceed to optional determination block 570.

At determination block 570, computer-executable instructions stored on a memory of a device, such as the first wireless earbud device, may be executed to make a determination as to whether the first link quality score is less than the last peer link quality score. To determine whether the first link quality score is less than the last peer link quality score, the first wireless earbud device may compare the first link quality score to the last peer link quality score. In some embodiments, the first wireless earbud may also determine a difference between the first link quality score and the last peer link quality score, as in some instances handover may not occur if the difference is below a certain amount (e.g., a small difference, etc.).

If it is determined at determination block 570 that the first link quality score is not less than or equal to the last peer link quality score, the process flow 500 may return to block 520 to continue monitoring link quality score parameters. This may indicate that the first wireless earbud device is providing a better connection to the device than the second wireless earbud device.

If it is determined at determination block 570 that the first link quality score is less than or equal to the last peer link quality score, the process flow 500 may proceed to determination block 580. This may indicate that the first wireless earbud device is providing a worse connection to the device than the second wireless earbud device.

At determination block 580, computer-executable instructions stored on a memory of a device, such as the first wireless earbud device, may be executed to make a determination as to whether a minimum handover time threshold has elapsed. To determine whether a minimum handover time threshold has elapsed, the first wireless earbud device may determine a timestamp associated with the last handover, if one occurred. In some embodiments, a timer may be initiated when a handover occurs that can be used to determine if the minimum handover time threshold is satisfied. The first wireless earbud may determine whether the elapsed time satisfies the minimum handover time threshold. The minimum handover time threshold may be used to avoid the "ping pong" effect.

If it is determined at determination block 580 that the minimum handover time threshold has not elapsed, the process flow 500 may return to block 520 to continue monitoring link quality score parameters.

If it is determined at determination block 580 that the minimum handover time threshold has elapsed, the process flow 500 may proceed to block 590, at which handover to the second wireless earbud device may be initiated. The process flow 500 may proceed to optional block 592, at which one or more timers may be reset at the second wireless earbud device, such as a handover timer (indicative of the last handover occurrence) and a valid score timer (indicative of the time the second wireless earbud device received the first link quality score from the first wireless earbud device). The second wireless earbud device may then implement monitoring of link quality score parameters at block 520.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
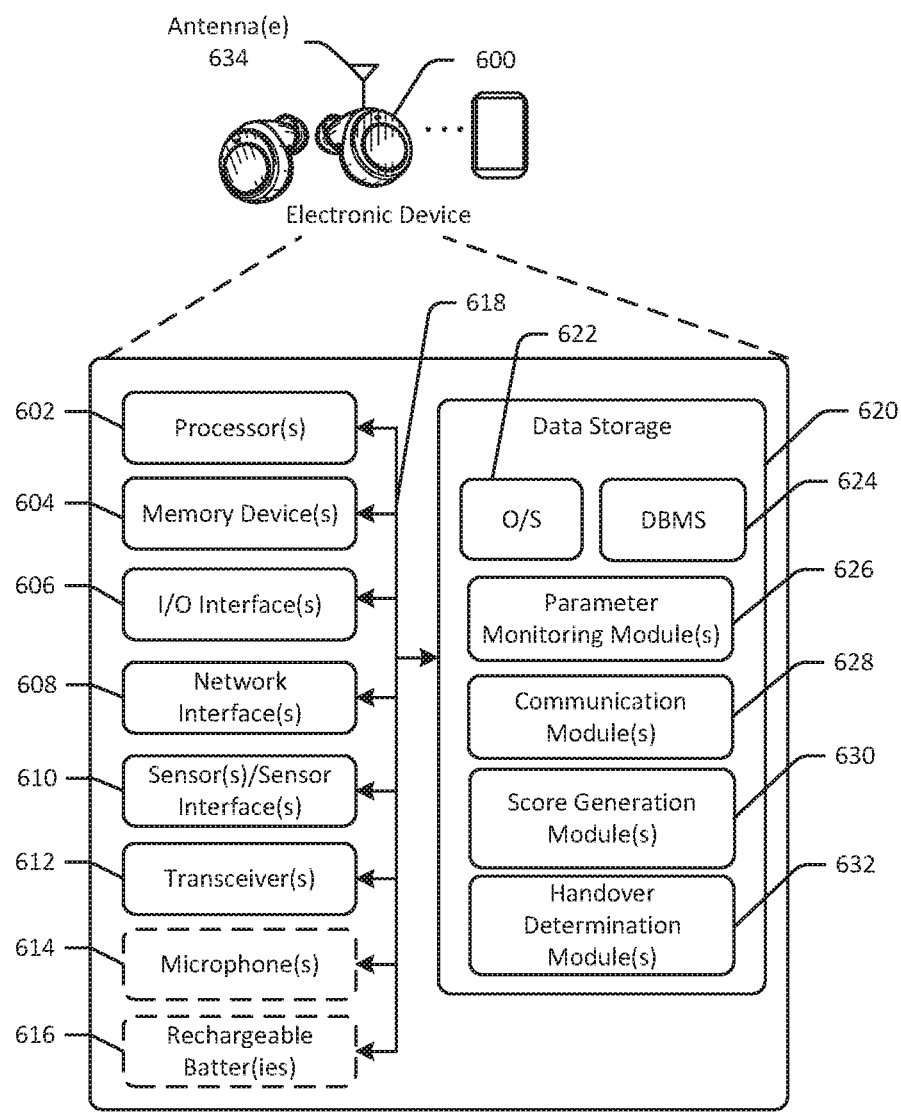
FIG. 6 schematically illustrates an example architecture of an electronic device in accordance with one or more embodiments of the disclosure.

FIG. 6 is a schematic block diagram of one or more illustrative electronic device(s) 600 in accordance with one or more example embodiments of the disclosure. The electronic device(s) 600 may be the wireless earbud devices described in any one or more of FIGS. 1-5, and, in other embodiments, may include any suitable computing device including, but not limited to, a server system, a mobile device such as a smartphone, a tablet, an e-reader, a wearable device, or the like; a desktop computer; a laptop computer; a content streaming device; a set-top box; a scanning device; a barcode scanning wand; or the like. The electronic device(s) 600 may correspond to an illustrative device configuration for the wireless earbud device(s) of FIGS. 1-5.

The electronic device(s) 600 may be configured to communicate with one or more servers, user devices, or the like. The electronic device(s) 600 may be any suitable device, such as a mobile device, and may be configured to determine voice commands, determine wakeword utterances, determine and/or control other devices, and other operations. The electronic device(s) 600 may be configured to present content, detect sound, output digital content, and other functionality In some embodiments, a single remote server or a single group of remote servers may be configured to perform more than one type of functionality in conjunction with an electronic device.

The electronic device(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional microphone(s) 614, one or more optional rechargeable batteries 616, and data storage 620. The electronic device(s) 600 may further include one or more bus(es) 618 that functionally couple various components of the electronic device(s) 600. The electronic device(s) 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, NFMI hardware, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more parameter monitoring module(s) 626, one or more communication module(s) 628, one or more score generation module(s) 630, and/or one or more handover determination module(s) 632. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, historical data for peer link quality scores, user profile information, and/or other information.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the parameter monitoring module(s) 626 may include computer-executable instructions, code, or the like that responsive to execution by one or more of the processor(s) 602 may perform functions including, but not limited to, determining sliding window/intervals, determining RSSI measurements, determining RSSI values using a mapping table, determining packet error rate measurements, determining packet error rate values, determining time intervals associated with respective measurements and/or values, and the like.

The communication module(s) 628 may include computer-executable instructions, code, or the like that responsive to execution by one or more of the processor(s) 602 may perform functions including, but not limited to, sending and/or receiving data, including content, sending and/or receiving instructions and commands, and the like.

The score generation module(s) 630 may include computer-executable instructions, code, or the like that responsive to execution by one or more of the processor(s) 602 may perform functions including, but not limited to, determining link quality scores, determining mapping table values, and the like.

The handover determination module(s) 632 may include computer-executable instructions, code, or the like that responsive to execution by one or more of the processor(s) 602 may perform functions including, but not limited to, determining whether to handover a connection, determining whether one or more timers are expired, determining threshold values, comparing timers to thresholds, comparing scores to thresholds, determining active peer link quality scores, and the like.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(e) 634 may include any suitable type of antenna depending, for example, on the communications protocols used to transmit or receive signals via the antenna (e) 634. Non-limiting examples of suitable antennae may include directional antennae, non-directional antennae, dipole antennae, folded dipole antennae, patch antennae, multiple-input multiple-output (MIMO) antennae, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

Optional camera(s) may be any device configured to capture ambient light or images. The microphone(s) 614 may be any device configured to receive analog sound input or voice data. The rechargeable batter(ies) 616 may be any suitable power storage device, such as a lithium ion battery and may be in various form factors, such as pouch form factors, cylindrical form factors, and the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a first earbud comprising a first memory and a first processor; and
a second earbud wirelessly coupled to the first earbud over both a Near-Field Magnetic Induction (NFMI) connection and a first Bluetooth Low Energy (BLE) connection, the second earbud comprising a second memory and a second processor;
wherein the first processor is configured to access the first memory and execute computer-executable instructions to:
establish a first Bluetooth connection to a device that is configured to provide audio data to the first earbud;
send the audio data to the second earbud;
determine, during a first time interval, a first average Received Signal Strength Indicator (RSSI) value for the first Bluetooth connection, wherein the first average RSSI value is an integer that corresponds to an average measured RSSI;
determine, during the first time interval, a first average packet error rate value for the first Bluetooth connection, wherein the first average packet error rate value is an integer that corresponds to an average measured packet error rate;
determine a sum of the first RSSI value and one-fourth of the first average packet error rate value;
determine a first link quality score using the sum, wherein the first link quality score is equal to the sum divided by two and subtracted from 100, and wherein the first link quality score represents a quality of the first Bluetooth connection;
determine that the first link quality score is less than an earbud handover threshold link quality value, wherein the earbud handover threshold link quality value is used to trigger handover of a connection to the device to a secondary earbud;
cause the second earbud to receive the audio data directly from the device over the first Bluetooth connection; and
receive the audio data from the second earbud.

2. The system of claim 1, wherein the second processor is configured to access the second memory and execute computer-executable instructions to:
receive the first link quality score from the first earbud at a first time;
determine, during a second time interval, a second average packet error rate value and a second average packet error rate value for the first Bluetooth connection;
determine, using the second average packet error rate value and the second average packet error rate value, a second link quality score;

determine that an elapsed time since the first time is less than a valid score threshold, wherein the valid score threshold represents a length of time before a link quality score expires;
determine that the second link quality score is less than the first link quality score;
determine that a predetermined time since the second earbud started receiving audio data from the device has not elapsed, wherein the predetermined time represents a minimum length of time between handover events; and
determine that the second earbud is to continue receiving the audio data from the device.

3. The system of claim 2, wherein the second processor is further configured to access the second memory and execute the computer-executable instructions to:
determine that the elapsed time since the first time is greater than the valid score threshold;
determine that the second link quality score is less than the earbud handover threshold link quality value;
determine that the predetermined time has elapsed since the first Bluetooth connection was established;
cause the first earbud to receive the audio data directly from the device; and
receive the audio data from the first earbud.

4. The system of claim 1, wherein the first processor is further configured to access the first memory and execute the computer-executable instructions to:
determine an average RSSI measurement during a first time interval;
determine, based on a first mapping table, the first RSSI value being associated with the average RSSI measurement, the first mapping table comprising association information between average RSSI measurement values and respective RSSI values;
determine an average packet error rate measurement during the first time interval; and
determine, based on a second mapping table, the first packet error rate value being associated with the average packet error rate measurement, the second mapping table comprising association information between average packet error rate measurement values and respective average packet error rate values.

5. A system comprising:
a first wireless earbud device comprising first memory and at least one first processor configured to access the first memory and execute computer-executable instructions to:
receive audio data directly from a device over a first connection with the device;
send the audio data to a second wireless earbud over a second connection;
determine a first RSSI value for the first connection over a first time period;
determine a first packet error rate value for the first connection during the first time period;
determine a first link quality score using a sum of the first RSSI value and one-fourth of the first packet error rate value, wherein the first link quality score is equal to the sum divided by two and subtracted from 100;
determine that the first link quality score is less than or equal to a handover threshold value;
cause a second wireless earbud device to receive audio data directly from the device; and
receive the audio data from the second wireless earbud device over the second connection.

6. The system of claim 5, wherein the at least one first processor is further configured to access the first memory and execute the computer-executable instructions to:
prior to causing the second wireless earbud device to receive the audio data directly from the device, determine that a first handover threshold time has elapsed since the first connection was established.

7. The system of claim 5, wherein the at least one first processor is further configured to access the first memory and execute the computer-executable instructions to:
receive, after a second handover threshold time has elapsed, a second link quality score from the second wireless earbud device, wherein the second link quality score is less than the first link quality score;
receive the audio data directly from the device; and
send the audio data to the second wireless earbud device via the second connection;
wherein the second handover threshold time is longer than the first handover threshold time.

8. The system of claim 5, wherein the second wireless earbud device comprises second memory and at least one second processor configured to access the second memory and execute computer-executable instructions to:
receive the first link quality score from the first wireless earbud device;
receive the audio data directly from the device;
determine a second link quality score for the first connection;
determine that the second link quality score is greater than the first link quality score and less than or equal to the handover threshold value; and
maintain the first connection.

9. The system of claim 8, wherein the at least one second processor is further configured to access the second memory and execute the computer-executable instructions to:
determine that a difference between a first battery level of the first wireless earbud device and a second battery level of the second wireless earbud device is greater than a predetermined value; and
cause the first wireless earbud device to receive audio data directly from the device.

10. The system of claim 8, wherein the at least one second processor is further configured to access the second memory and execute the computer-executable instructions to:
determine that an elapsed time since the first link quality score was received is greater than a valid score threshold time;
determine a third link quality score for the first connection;
determine that the third link quality score is less than or equal to the handover threshold value; and
cause the first wireless earbud device to receive the audio data directly from the device.

11. The system of claim 10, wherein the at least one first processor is further configured to access the first memory and execute the computer-executable instructions to:
determine a fourth link quality score for the first connection;
determine that the fourth link quality score is greater than the handover threshold value; and
maintain the first connection.

12. The system of claim 5, wherein the at least one first processor is further configured to access the first memory and execute the computer-executable instructions to:
receive a second link quality score for the first connection from the second wireless earbud device prior to establishment of the first connection;
determine that an elapsed time since the second link quality score was received is less than a valid score threshold time; and
determine that the second wireless earbud device was removed from an ear.

13. The system of claim 5, wherein the at least one first processor is further configured to access the first memory and execute the computer-executable instructions to:
determine an average RSSI measurement during a first time interval;
determine, based on a first mapping table, the first RSSI value being associated with the average RSSI measurement, the first mapping table comprising association information between average RSSI measurement values and respective RSSI values;
determine an average packet error rate measurement during the first time interval; and
determine, based on a second mapping table, the first packet error rate value being associated with the average packet error rate measurement, the second mapping table comprising association information between average packet error rate measurement values and respective average packet error rate values.

14. The system of claim 5, wherein the second connection is an audio-only connection, and wherein the first wireless earbud device is also coupled to the second wireless earbud device over a third connection separate from the second connection, wherein the third connection is used to exchange control and configuration data.

15. A method comprising:
determining, by a first wireless earbud device, a first RSSI value for a first connection to a device, wherein the first wireless earbud device receives audio data directly from the device;
determining, by the first wireless earbud device, a first packet error rate value for the first connection;
determining a first link quality score using a sum of the first RSSI value and one-fourth of the first packet error rate value, wherein the first link quality score is equal to the sum divided by two and subtracted from 100;
determining, by the first wireless earbud device, that the first link quality score is less than or equal to a handover threshold value;
causing, by the first wireless earbud device, a second wireless earbud device in wireless communication with the first wireless earbud device to receive audio data directly from the device;
determining, by the second wireless earbud device, that a second link quality score for the first connection is less than or equal to the handover threshold value; and
causing, by the second wireless earbud device, the first wireless earbud device to receive the audio data directly from the device.

16. The method of claim 15, further comprising:
determining, by the first wireless earbud device, that a first handover threshold time has elapsed since the first connection was established.

17. The method of claim 15, further comprising:
receiving, by the second wireless earbud device, the first link quality score from the first wireless earbud device;
determining, by the second wireless earbud device, a second link quality score for the second connection;
determining, by the second wireless earbud device, that the second link quality score is greater than the first link quality score and less than or equal to the handover threshold; and maintaining, by the second wireless earbud device, the first connection.

18. The method of claim 17, further comprising:
determining, by the second wireless earbud device, that an elapsed time since the first link quality score was received is greater than a valid score threshold time;
determining, by the second wireless earbud device, a third link quality score for the first connection;
determining, by the second wireless earbud device, that the third link quality score is less than or equal to the handover threshold value; and
causing, by the second wireless earbud device, the first wireless earbud device to receive the audio data directly from the device.

19. The method of claim 15, further comprising:
determining, by the second wireless earbud device, that a difference between a first battery level of the first wireless earbud device and a second battery level of the second wireless earbud device satisfies a battery consumption threshold; and
causing, by the second wireless earbud device, the first wireless earbud device to receive the audio data directly from the device.

\* \* \* \* \*